Figure 1:
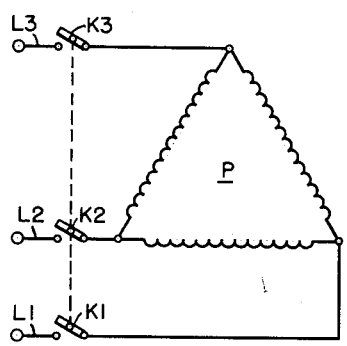

Feb. 14, 1956   H. J. BICHSEL ET AL   2,734,981
ARC DRIVE CONTROL FOR RECTIFIER WELDER
Filed Feb. 28, 1952

WITNESSES:
Robert C Baird
Leon J. Jaza

INVENTORS
Harry J. Bichsel &
Martin Rebuffoni.
BY
Hyman Diamond.
ATTORNEY

United States Patent Office 2,734,981
Patented Feb. 14, 1956

2,734,981
ARC DRIVE CONTROL FOR RECTIFIER WELDER

Harry J. Bichsel, East Aurora, and Martin Rebuffoni, Williamsville, N. Y., assignors to Westinghouse Electric Corporation, East Pittsburgh, Pa., a corporation of Pennsylvania Application February 28, 1952, Serial No. 273,814

14 Claims. (Cl. 219—8)

Our invention relates to arc welders and has particular relation to arc welders of the rectifier type such as the Westinghouse RA welder.

A rectifier welder of the type to which our invention relates is disclosed in an application Serial No. 176,302 to Charles P. Croco, Charles H. Jennings, Ray Vern Lester, and Emil A. Steinert, filed July 28, 1950, and assigned to Westinghouse Electric Corporation. Many welders of the type disclosed in this application have now been sold and on the whole they have operated successfully. In certain situations, however, shortcomings were encountered.

It was found that in the welding of pipe using the "drag" technique, that is, dragging an insulation-covered electrode along the pipe, difficulty was encountered in producing sound joints. The welding operators found that they could not produce sound joints with the facility to which they were accustomed in using the apparatus. The same situation was encountered in producing vertical and overhead welds.

It is, accordingly, an object of our invention to provide a rectifier arc welder having a wide range of use.

Another object of our invention is to provide a rectifier arc welder capable of producing satisfactory welds with facility in situations in which the present rectifier welder disclosed in the Croco et al. application presents difficulties.

An incidental object of our invention is to provide a novel rectifier circuit.

Our invention arises from the realization that the unsatisfactory operation of the arc welder disclosed in the Croco et al. application occurs in situations in which the electrode tip is very close to the work and that in such situations the incidence of short circuits by globules or threads of melted metal, and resulting cooling of the arc, is high. We have also realized that as regards the effect of such short circuits, the Croco et al. rectifier welder differs from those in which the welding power is derived from a rotary generator in the fact that a short circuit produces a transient in many rotary generators, and this transient tends to disrupt the globules or threads and to eliminate the short circuit, while in a Croco et al. welder the variations tend to follow the static characteristic of the supply (the rectifier), and a transient does not occur or has a smaller disrupting effect on the globules and threads than in a generator. In accordance with our invention, the disruption of the globules is highly accelerated by injecting additional current into the arc when the electrode tip is near the work and there is a tendency to short the arc. The flow of heat to the joint being welded is thus maintained substantially continuous.

To accomplish this object, we have provided a rectifier welder including an auxiliary source for maintaining the arc when it is short and its voltage is low. Such a facility is called arc drive and is in accordance with specific aspects of our invention produced by an auxiliary rectifier system which is connected to the main rectifier in such manner as to add to the current of the main rectifier when the arc voltage falls below a predetermined value. As the globules or threads of metal form and grow, the arc voltage decreases. We have realized that the auxiliary voltage may be set at such a magnitude as to become effective shortly before the actual short circuit occurs. Accordingly, while in accordance with the broader aspects of our invention the voltage of the auxiliary rectifier may vary over a wide range, it is preferred that the auxiliary voltage be so set as to blow out the globules or threads before short circuits occur, and this is an important specific aspect of our invention.

We have also realized that the globules form rapidly and must be quickly disrupted. The auxiliary source must, therefore, have a very low time constant of the order of a very small fraction of a second (preferably of the order of .003 second or less), and this is another specific aspect of our invention.

For economic reasons, it is desirable that the auxiliary rectifier be small and of low cost. This object is achieved in accordance with another specific aspect of our invention by setting the auxiliary rectifier voltage at a value just below the lowest voltage at which the selected welding electrode operates. The auxiliary rectifier then comes into operation a small part of the time of use of the system, that is, has a low duty cycle, and may be small.

Arc drive may also be produced in a rectifier welder in accordance with the broader aspect of our invention by providing reactors having cores made up of steel punchings, interleaved with pressed board (of phenolic condensation products, for example) punchings, in a system such as is disclosed in the Croco et al. application. Arc drive produced in this manner has not proven as satisfactory as that produced with an auxiliary rectifier because it is highly sensitive to changes in the supply voltage. We have found that the short-circuit current in the reactor system varies about 25% for 10% variation in the line voltage.

Figure 2:
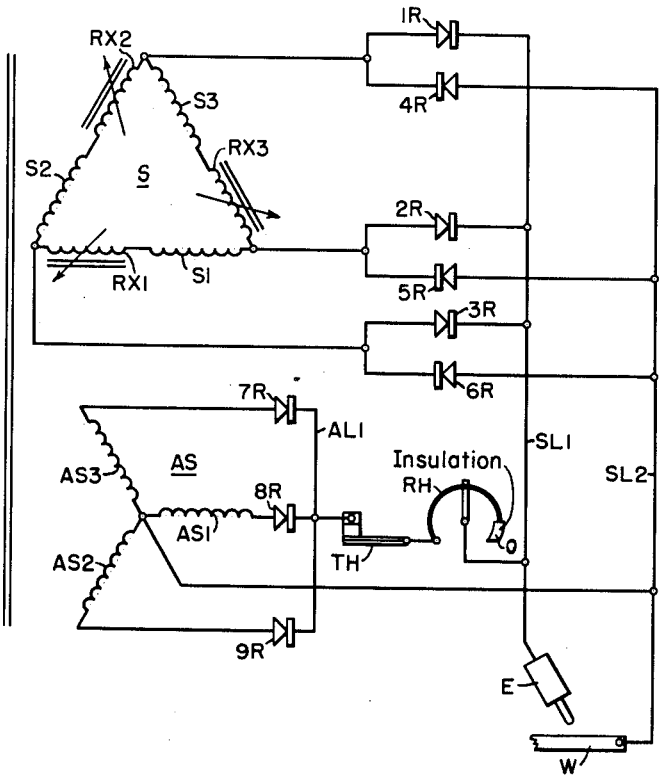
Figure 2:
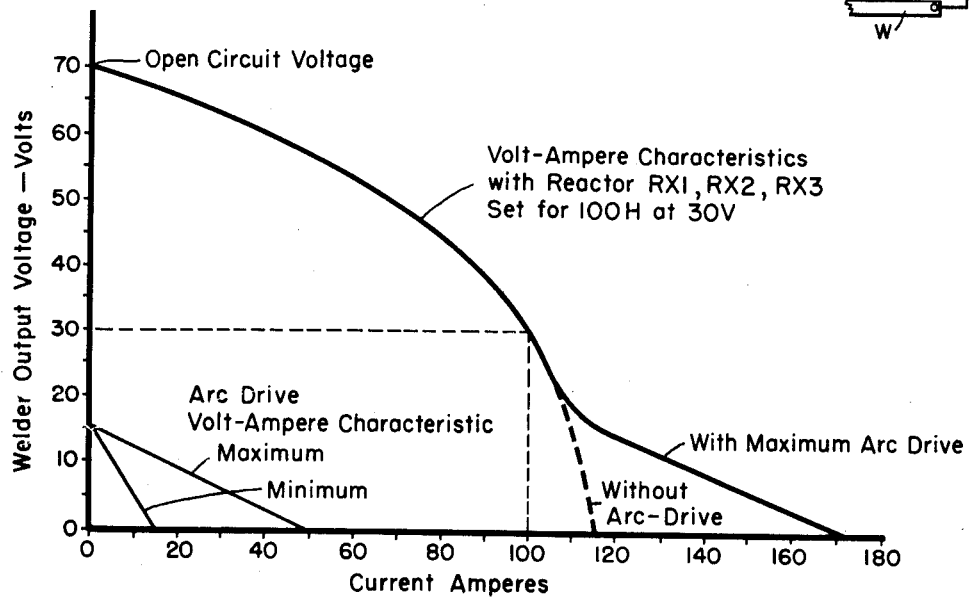

The novel features which we consider characteristic of our invention are set forth with particularity in the appended claims. Our invention itself, however, together with additional objects and advantages thereof, may be understood from the following description of a specific embodiment when read in connection with the accompanying drawing, in which:

Fig. 1 is a circuit diagram of an arc welding system in accordance with our invention; and Fig. 2 is a graph illustrating the operation of the system shown in Fig. 1 and of the system disclosed in the Croco et al. application.

The apparatus shown in Fig. 1 includes a three-phase transformer T having a primary P, the windings of which are connected in a delta network. The apices of this network are adapted to be connected to power buses L1, L2, L3 through the contacts K1, K2, K3 of a circuit breaker or through fuses. The transformer T has a main secondary S and an auxiliary secondary AS. The windings S1, S2, S3 of the main secondary S are connected in the same manner as those of the secondary disclosed in the Croco et al. application, each in series with a variable reactor winding RX1, RX2, RX3 in a delta network.

The welding electrode E and the work W are connected, respectively, to a pair of supply terminals SL1 and SL2. The apices of the secondary network S are connected to the terminals SL1 and SL2 through two groups of rectifiers 1R, 2R, 3R and 4R, 5R, 6R, respectively, as disclosed in the Croco et al. application. The rectifiers 1R, 2R, 3R of one group are connected each between an apex and one terminal SL1 in such a sense as to conduct current of positive polarity from the apex to the terminal SL1 and the rectifiers 4R, 5R, 6R of the other group are connected each to conduct positive current from the other terminal SL2 to an apex.

The windings AS1, AS2, AS3 of the auxiliary secondary are connected in a star network. The ends of these windings are connected each through a rectifier 7R, 8R, 9R, respectively, to a common conductor AL1. This conductor is in turn connected to the first terminal SL1 through a thermostat TH and a rheostat RH, designed to adjust the magnitude of the current transmitted to this terminal. The neutral of the secondary AS is connected directly to the other terminal SL2. The rectifiers are so poled as to conduct positive current from the conductor AL1 to the first terminal SL1. The thermostat TH is of the self-heating type and is designed to open the circuit when current of a predetermined magnitude is supplied in this circuit for a predetermined time interval. The rheostat RH is designed to vary the current supplied by the auxiliary secondary over a wide range or to cut it off entirely.

The main windings S1, S2, S3 have a number of turns such that the voltage produced by the main secondary at the terminals SL1 and SL2 is sufficient for normal welding operations. This voltage should be adequate for starting an arc and for welding under ordinary conditions. The auxiliary windings AS1, AS2, AS3 have a number of turns such that the auxiliary secondary AS produces at the terminals a voltage substantially smaller than the normal voltage produced by the main secondary but which is capable of supplying adequate arc drive. While this voltage may vary over a wide range, we have found that an auxiliary secondary capable of producing approximately 16 volts arc drive is suitable for many purposes.

The selection of the voltage of the auxiliary rectifier, in general, depends on the properties of the welder. For economy reasons, it is desirable that the auxiliary voltage should be lower than the lowest normal operating average arc voltage of the electrodes. It is also desirable that the auxiliary voltage be sufficiently high to become effective in sufficient time to blow out the globules and threads before they produce short circuits. Of the electrodes used, those designated as E6010, E6012, and E6013 under American Welding Society Nomenclature have operating arc voltages of between 22 and 26 volts. With such electrodes, the auxiliary voltage of 16 volts seems suitable although a somewhat higher voltage may be desirable to assure blowing out of the globules or threads before they actually cause short circuits. The E6020 electrode has an operating voltage of 28 to 35 volts, and for such electrode an auxiliary voltage of 20 to 24 volts has proved suitable.

It is also desirable that the auxiliary voltage be such that the ratio between the maximum total current at short circuit, with the auxiliary source in operation, and the normal operating arc current be of the order of 1.7 to 2.

The operation of the circuit shown in Fig. 1 is illustrated by the curves shown in Fig. 2. These curves represent actual operating conditions. For each curve, voltage is plotted vertically and current horizontally.

Among the curves, there is a heavy-lined curve having two branches, one extending as a heavy broken-line convex loop and the other as a heavy full-line concave tail. The heavy full-line curve having the heavy broken line branch is a plot of the volt-ampere characteristic of the main circuit with the reactors RX1, RX2, RX3 set for 100 amperes at 30 volts. It is seen that the potential output of this circuit drops to zero volts, that is, short circuit, at approximately 118 amperes. The full-line curves of medium weight represent the volt-ampere characteristic of the arc-drive circuit in accordance with our invention with the rheostat RH set for maximum and minimum current, respectively, as labeled. It is seen that in the typical situation illustrated, this circuit has an output potential of 16 volts and is capable of delivering 15 to 50 amperes. Because of the manner in which the rectifiers 7R, 8R, 9R are connected in the circuit, this supply does not become effective until the voltage of the main circuit drops to less than the voltage of the arc drive circuit. For voltages of the main circuit, less than the voltage of the arc-drive circuit, the characteristic of the auxiliary secondary is superimposed on that of the main secondary, and the resulting characteristic is represented by the heavy full-line curve having the heavy full-line tail. It is seen that with the arc-drive voltage superimposed, the short-circuit condition is reached at approximately 172 amperes rather than 118 amperes. Between these magnitudes of current, substantial power may be supplied to the arc although the arc may be short, its current high and its voltage low. Short-circuiting threads or globules are thus instantaneously disrupted. Note that the maximum current available (172 amperes) is 1.72 times the normal operating current of 100 amperes.

In the use of the apparatus in accordance with our invention, the welding electrode E and the work W are connected between the terminals SL2 and SL1 and an arc is struck between the electrode and the work. During normal welding operations, the arc voltage is greater than the voltage delivered by the arc-drive circuit, and current flow from the auxiliary secondary AS is blocked by the rectifiers 7R, 8R, 9R. Current from the terminals SL1 and SL2 to the auxiliary secondary is also blocked by the rectifiers 7R, 8R, 9R.

When the electrode E is so near to the work W that the arc voltage is low and the voltage between the terminals SL1 and SL2 is exceeded by the voltage of the auxiliary secondary AS, current flows from the auxiliary secondary to the terminals SL1 and SL2. The secondary AS then supplies current to disrupt the tendency of short circuits to occur. Thus, the current and heat flow to the welding electrode E and the work W is maintained.

The magnitude of the arc-drive current may be set by properly setting the rheostat RH. While the rheostat may vary the current over any desired range, in the usual situation, it is designed to vary the current from 15 amperes to 50 amperes. The rheostat RH also includes a position O in which the arc-drive circuit is entirely open.

Under ordinary circumstances, the current supplied by the arc-drive circuit is less than 1 ampere. We have found, however, in our work that peak currents as high as 50 amperes or more, depending on circuit impedance, may flow through the arc-drive circuit, particularly when the arc is instantaneously short-circuited by globules of the melted metal. Our experience has led us to the realization that the arc-drive circuit must be protected, and for this purpose we have introduced the self-heating thermostat TH which is designed to open in about one second when the rheostat RH is set for maximum and short-circuit current flows and in about 15 seconds under the same conditions when the rheostat is at its minimum setting.

We have found that the apparatus specifically disclosed herein is capable of producing highly satisfactory results. Such results have been produced not only in the laboratory but in the field by the more than 1,000 welders in accordance with our invention which are now in use. Field reports on these welders indicate that they are an unqualified success.

While the specific system herein disclosed has many advantages, it is conceivable that other systems within the scope of our invention may be devised. Such a system may include a transformer differing from that specifically disclosed in Fig. 1. For example, the main secondary may be connected in delta or may be connected in star and the auxiliary secondary either in delta or in star. In addition, apparatus in accordance with our invention may be designed for operation with polyphase supplies of other types than three-phase, for example, six-phase supplies. Such modifications of our invention are regarded as within its scope.

While, then, we have shown a specific embodiment of our invention, we are fully aware that many modifications are possible. Our invention, therefore, is not to be limited except insofar as is necessitated by the prior art and by the spirit of the appended claims.

We claim as our invention:

1. A rectifier arc welder comprising terminals for supplying current for welding; first means for supplying alternating current; and first rectifier means connected between said first means and said terminals; said first supply means being adapted to supply a voltage equal to the normal welding voltage at said terminals; said arc welder being characterized by second means for supplying alternating current; by second rectifier means connected between said second means and said terminals, said second supply means being adapted to deliver at said terminals an adequate arc-drive voltage substantially smaller than said normal welding voltage; and by self-resetting current responsive circuit interrupting means in circuit with said second supply means responsive to the current delivered by said second supply means, for opening the connections between said second supply means and said terminals if current of at least a predetermined magnitude is delivered by said second supply means for a predetermined time interval which interval varies with said magnitude.

2. A rectifier arc welder comprising terminals for supplying current for welding; a transformer having a primary and a secondary; and rectifier means connected between said secondary and said terminals; said secondary having a number of turns such that it is adapted to supply a voltage equal to the normal welding voltage at said terminals; said arc welder being characterized by the fact that said transformer has another secondary; by additional rectifier means connected between said secondary and said terminals, the number of turns of said secondary being such that it is adapted to deliver at said terminals an adequate arc-drive voltage substantially smaller than said normal welding voltage; and by a thermostat in circuit with said other secondary, responsive to the current delivered by said other secondary, for opening the connections between said other secondary and said terminals if current of at least a predetermined magnitude is delivered by said other secondary for a predetermined time interval which interval varies with said magnitude.

3. In combination, a polyphase transformer having a first plurality of secondary windings and a second plurality of secondary windings; means for connecting said first plurality in a polygonal network; means for connecting said second plurality in a star network; a first load terminal; a second load terminal; first rectifier means; means for connecting said first rectifier means to conduct current of one polarity between each apex of said polygonal network and said first terminal; second rectifier means; means for connecting said second rectifier means to conduct current of the opposite polarity between each said apex and said second terminal; third rectifier means; means for connecting said third rectifier means to conduct current of said first polarity between the open ends of said star network and said first terminal and means for connecting the neutral of said star network to said second terminal.

4. In combination, a polyphase transformer having a first plurality of secondary windings and a second plurality of secondary windings; means for connecting said first plurality in a polygonal network; means for connecting said second plurality in a star network; a first load terminal; a second load terminal; first rectifier means; means for connecting said first rectifier means to conduct current of one polarity between each apex of said polygonal network and said first terminal; second rectifier means; means for connecting said second rectifier means to conduct current of the opposite polarity between each said apex and said second terminal; third rectifier means; and means for connecting said third rectifier means to conduct current of said first polarity between said first and second terminals and said star network.

5. In combination, a polyphase transformer having a first plurality of secondary windings and a second plurality of secondary windings; means including a variable reactor in series with each secondary winding for connecting said first plurality in a polygonal network; means for connecting said second plurality in a star network; a first load terminal; a second load terminal; first rectifier means; means for connecting said first rectifier means to conduct current of one polarity between each apex of said polygonal network and said first terminal; second rectifier means; means for connecting said second rectifier means to conduct current of the opposite polarity between each said apex and said second terminal; third rectifier means; and means for connecting said third rectifier means to conduct current of said first polarity between said first and second terminals and said star network.

6. The combination according to claim 4 characterized by the fact that the second plurality of secondary windings is adapted to supply a substantially smaller potential than the first plurality at the first and second load terminals.

7. An arc welder comprising a main static rectifier having output terminals and being adapted to deliver at said output terminals the normal operating current for welding, separate current supply means also having output terminals, and a lower open circuit voltage than that of said main rectifier, and means connecting the output terminals of said separate supply to the output terminals of said main rectifier, the magnitude of said lower voltage being such that said supply is adapted to become effective when the arc voltage becomes small by reason of the formation of metal globules or threads during welding and to supply current to blow out said globules or threads before they cause short circuits.

8. Apparatus according to claim 7, characterized by the fact that the circuit including the separate current supply means has a low time constant.

9. Apparatus according to claim 7, characterized by the fact that the circuit including the separate current supply means has so low a time constant and voltage of such magnitude that globules or threads of metal tending to cause short circuits are blown out before they actually cause short circuits.

10. Apparatus according to claim 7, characterized by the fact that the voltage of the separate current supply means is lower than the lowest operating average arc voltage at which the welder is to operate.

11. Apparatus according to claim 7, characterized by the fact that the maximum current produced by the main rectifier and the separate current supply means is approximately 1.7 to 2 times the average normal current at which the welder is to operate.

12. An arc welder comprising a main static rectifier having output terminals and adapted to deliver the normal operating current for welding at said output terminals, an auxiliary static rectifier also having output terminals, and having a substantially lower open-circuit voltage than that of said main rectifier, and means connecting said output terminals of said auxiliary rectifier to said output terminals of said main rectifier, the magnitude of said lower open-circuit voltage being such that said auxiliary rectifier is adapted to become effective only when the arc voltage becomes small by reason of the formation of metal globules or threads during welding and to deliver current to blow out said globules or threads before they cause short circuits.

13. An arc welder to be supplied from an alternating-current source comprising a pair of terminals between which an arc is produced, a first rectifier circuit interposed between said source and said terminals and when supplied at the voltage of said source adapted to operate at the arc voltage of said arc and capable of supplying at said arc voltage the normal arc welding current during welding intervals, and a second rectifier circuit interposed between said source and said terminals and when supplied at the voltage of said source adapted to operate at a voltage substantially smaller than said arc voltage which voltage is adequate for arc drive, said second rectifier being connected to supply power at said smaller voltage at the same polarity as said first circuit whereby said second rectifier supplies power for arc drive only during the short intermittent intervals occurring during said welding intervals when the arc voltage drops below said smaller voltage.

14. An arc welder to be supplied from an alternating current source comprising a pair of terminals between which an arc is produced, a first rectifier circuit interposed between said source and said terminals and when supplied at the voltage of said source adapted to operate at the arc voltage of said arc and capable of supplying at said arc voltage the normal arc welding current during welding intervals, a second rectifier circuit interposed between said source and said terminals and when supplied at the voltage of said source adapted to operate at a voltage substantially smaller than said arc voltage which voltage is adequate for arc drive, said second rectifier circuit being connected to supply power at said smaller voltage at the same polarity as said first circuit for arc drive, whereby said second rectifier circuit supplies power for arc drive only during the short intermittent intervals occurring during said welding intervals, during which the arc voltage is less than said smaller voltage, and self-resetting current-responsive circuit-interrupting means in circuit with said second rectifier circuit for opening the connections between said second circuit and said terminals when current flows from said second circuit through said terminals for time intervals substantially longer than said short intermittent intervals.

References Cited in the file of this patent

UNITED STATES PATENTS

| | | |
|---|---|---|
| 1,902,485 | Arkenburgh | Mar. 21, 1933 |
| 2,096,824 | Price | Oct. 26, 1937 |
| 2,265,930 | Scott | Dec. 9, 1941 |
| 2,299,942 | Trevor | Oct. 27, 1942 |
| 2,322,955 | Perkins | June 29, 1943 |
| 2,509,380 | Walker | May 30, 1950 |
| 2,516,037 | Williams | July 18, 1950 |

FOREIGN PATENTS

| | | |
|---|---|---|
| 679,292 | Germany | Aug. 2, 1939 |